(12) United States Patent
Koike

(10) Patent No.: US 9,401,607 B2
(45) Date of Patent: *Jul. 26, 2016

(54) CHARGE AND DISCHARGE CONTROL CIRCUIT AND BATTERY DEVICE

(71) Applicant: Seiko Instruments Inc., Chiba-shi, Chiba (JP)

(72) Inventor: Toshiyuki Koike, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 113 days.

This patent is subject to a terminal disclaimer.

(21) Appl. No.: 14/190,908

(22) Filed: Feb. 26, 2014

(65) Prior Publication Data

US 2014/0239884 A1 Aug. 28, 2014

(30) Foreign Application Priority Data

Feb. 28, 2013 (JP) .................................. 2013-039653

(51) Int. Cl.
*H02J 7/00* (2006.01)
(52) U.S. Cl.
CPC .................................. *H02J 7/0034* (2013.01)
(58) Field of Classification Search
CPC ...................................................... H02J 7/0052

USPC .......................................................... 320/107
See application file for complete search history.

(56) References Cited

U.S. PATENT DOCUMENTS

| 7,456,614 | B2* | 11/2008 | Sato .......................... H02H 7/18 320/127 |
| 2008/0169787 | A1* | 7/2008 | Hsieh ..................... H01M 2/342 320/128 |
| 2009/0243546 | A1 | 10/2009 | Sakurai et al. |
| 2013/0026995 | A1* | 1/2013 | Kitajima ............... H01M 2/342 320/134 |

FOREIGN PATENT DOCUMENTS

JP 2009-247100 A 10/2009

\* cited by examiner

*Primary Examiner* — Robert Grant
*Assistant Examiner* — Harry O'Neill-Becerril
(74) *Attorney, Agent, or Firm* — Brinks Gilson & Lione

(57) ABSTRACT

Provided is a charge and discharge control circuit and a battery device which ensure high safety, even when a charger is reversely connected. The charge and discharge control circuit includes a consumption current increase circuit for supplying a current from a power supply terminal to a ground terminal, the consumption current increase circuit including a switch circuit configured to be turned on in response to a detection signal from a charger reverse connection detection circuit, which indicates that a charger is reversely connected.

3 Claims, 4 Drawing Sheets

CHARGE AND DISCHARGE CONTROL CIRCUIT AND BATTERY DEVICE

RELATED APPLICATIONS

This application claims priority under 35 U.S.C. §119 to Japanese Patent Application No. 2013-039653 filed on Feb. 28, 2013, the entire content of which is hereby incorporated by reference.

BACKGROUND OF THE INVENTION

1. Field of the Invention

The present invention relates to a charge and discharge control circuit and a battery device for detecting reverse connection of a charger, and more particularly, to a charge and discharge control circuit and a battery device for preventing a breakage of the charge and discharge control circuit and the battery device when a charger is reversely connected.

2. Description of the Related Art

At present, various kinds of portable electronic devices have become widespread. The portable electronic devices are generally driven by a battery device equipped with a battery. FIG. 4 illustrates a circuit diagram of a charge and discharge control circuit and a battery device according to the related art. The charge and discharge control circuit and the battery device according to the related art include an overcharge detection circuit 411, an overdischarge detection circuit 412, an overcurrent detection circuit 413, a delay circuit 415, a logic circuit 417, a charger reverse connection detection circuit 106, a VDD terminal 111, a VSS terminal 112, a DO terminal 113, a CO terminal 114, a VM terminal 115, external terminals 120 and 121, a secondary battery 101, a charge control N-channel FET transistor 108, a discharge control N-channel FET transistor 107, and a resistor 104.

In a charger reverse connection state in which a positive terminal of a charger is connected to the external terminal 121 and a negative terminal of the charger is connected to the external terminal 120, voltages of the VM terminal 115 and the external terminal 121 become closer to a power supply voltage as a voltage of the secondary battery 101, although being closer to a ground voltage in the normal state. When the voltage of the VM terminal 115 becomes a predetermined voltage, the charger reverse connection detection circuit 106 detects the reverse connection of the charger and outputs a signal to the logic circuit 417. The logic circuit 417 outputs signals of High and Low to gates of the charge control N-channel FET transistor 108 and the discharge control N-channel FET transistor 107, respectively. In this case, there exists no delay period from the detection of the reverse connection of the charger and the output of the High and Low signals. The charge control N-channel FET transistor 108 is turned on to supply a current, and the discharge control N-channel FET transistor 107 is turned off to supply only a charge current due to a parasitic diode. Then, the charger reverse connection detection circuit 106 stops the discharge of the secondary battery 101.

In this manner, when entering the charger reverse connection state, the discharge of the secondary battery 101 is stopped (see, for example, Japanese Patent Application Laid-open No. 2009-247100).

In the charge and discharge control circuit and the battery device according to the related art, however, there is a problem in that, after the reverse connection of the charger is detected to stop the discharge of the secondary battery, a current may flow from the VM terminal 115 to the VDD terminal 111 via a parasitic diode.

When the reverse connection of the charger is detected to stop the discharge, the voltage of the VM terminal 115 becomes a value determined by adding a voltage of the charger to the voltage of the secondary battery, and hence the voltage of the VM terminal 115 becomes higher than the voltage of the VDD terminal 111. Then, due to the parasitic diode connected from the VM terminal 115 to the VDD terminal 111, a current flows from the VM terminal 115 toward the VDD terminal 111. This current flows from the VM terminal 115 to the VDD terminal 111 and the external terminal 120. When this current is represented by Ivm, the voltage of the secondary battery is represented by Vbat, a resistance value between the VDD terminal 111 and the external terminal 120 is represented by R1, and a withstand voltage between the VDD terminal 111 and the VSS terminal 112 of the charge and discharge control circuit is represented by Vmax, a voltage of Vbat+Ivm×R1 is applied between the VDD terminal 111 and the VSS terminal 112 of the charge and discharge control circuit.

In this case, when (Vbat+Ivm×R1)>Vmax is established, a voltage higher than the withstand voltage is applied to the charge and discharge control circuit.

SUMMARY OF THE INVENTION

The present invention has been devised in order to solve the problem described above, and realizes a charge and discharge control circuit and a battery device with high safety, which are capable of preventing a current from flowing from a VM terminal to a VDD terminal via a parasitic diode when a charger is reversely connected.

In order to solve the related-art problem, a charge and discharge control circuit and a battery device according to one embodiment of the present invention are configured as follows.

The charge and discharge control circuit includes a consumption current increase circuit for supplying a current from a power supply terminal to a ground terminal, the consumption current increase circuit including a switch circuit configured to be turned on in response to a detection signal from a charger reverse connection detection circuit, which indicates that a charger is reversely connected. Further, the battery device includes the charge and discharge control circuit.

According to the charge and discharge control circuit and the battery device according to one embodiment of the present invention, after the reverse connection of the charger is detected, a current flowing from a VDD terminal is decreased, and hence an increase in voltage between the VDD terminal and a VSS terminal of the charge and discharge control circuit can be prevented, thereby preventing the charge and discharge control circuit from being applied with a voltage higher than a withstand voltage. Consequently, the safety of the battery device can be enhanced.

DETAILED DESCRIPTION OF THE PREFERRED EMBODIMENTS

Now, a charge and discharge control circuit and a battery device according to embodiments of the present invention are described below with reference to the accompanying drawings.

First Embodiment

Figure 1:
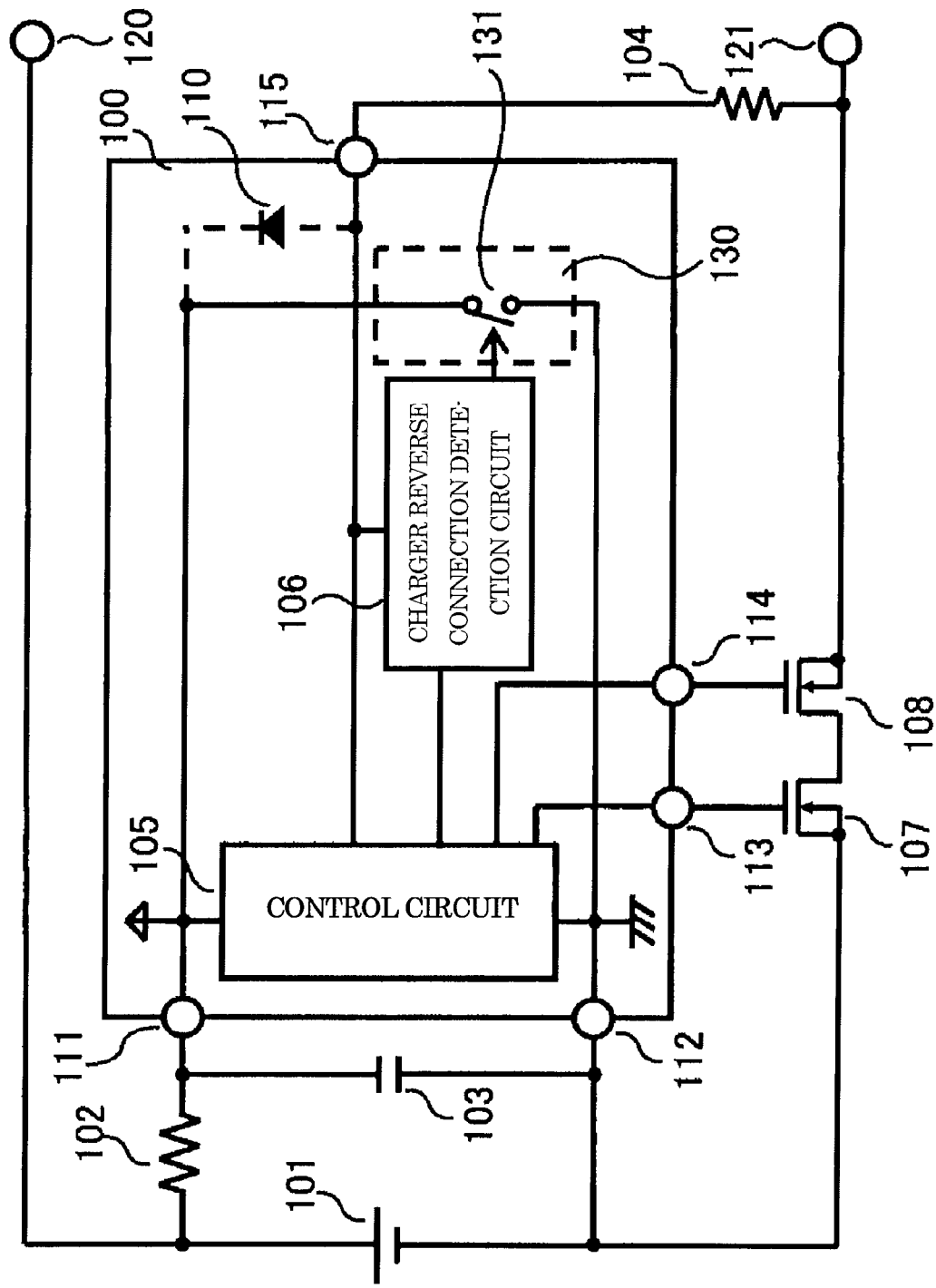
FIG. 1 is a circuit diagram of a charge and discharge control circuit and a battery device according to a first embodiment of the present invention.

FIG. 1 is a circuit diagram of a charge and discharge control circuit and a battery device according to a first embodiment of the present invention.

The charge and discharge control circuit and the battery device according to the first embodiment include a secondary battery 101, resistors 102 and 104, a capacitor 103, a discharge control N-channel FET transistor 107, a charge control N-channel FET transistor 108, a charge and discharge control circuit 100, and external terminals 120 and 121. The charge and discharge control circuit 100 includes a control circuit 105, a charger reverse connection detection circuit 106, a consumption current increase circuit 130, a VDD terminal 111, a VSS terminal 112, a DO terminal 113, a CO terminal 114, and a VM terminal 115. The consumption current increase circuit 130 includes a switch circuit 131.

The secondary battery 101 has a positive terminal connected to the external terminal 120 and one terminal of the resistor 102, and a negative terminal connected to one terminal of the capacitor 103, the VSS terminal 112, and a source and a back gate of the discharge control N-channel FET transistor 107. The other terminal of the resistor 102 is connected to the other terminal of the capacitor 103 and the VDD terminal 111. The discharge control N-channel FET transistor 107 has a gate connected to the DO terminal 113, and a drain connected to a drain of the charge control N-channel FET transistor 108. The charge control N-channel FET transistor 108 has a gate connected to the CO terminal 114, and a source and a back gate connected to the external terminal 121 and one terminal of the resistor 104. The other terminal of the resistor 104 is connected to the VM terminal 115. The control circuit 105 has a first input connected to the VDD terminal 111, a second input connected to the VSS terminal 112, a third input connected to the VM terminal 115, and a fourth input connected to a first output of the charger reverse connection detection circuit 106. The control circuit 105 has a first output connected to the DO terminal 113 and a second output connected to the CO terminal 114. The switch circuit 131 has one terminal connected to the VDD terminal 111 and the other terminal connected to the VSS terminal 112. The charger reverse connection detection circuit 106 has an input connected to the VM terminal 115, and a second output connected to the switch circuit 131 to control ON/OFF of the switch circuit 131.

Operations of the charge and discharge control circuit and the battery device according to the first embodiment are described below.

When a positive terminal of a charger is connected to the external terminal 120 and a negative terminal of the charger is connected to the external terminal 121 to charge the secondary battery 101 and when a voltage of the secondary battery 101 increases to be a predetermined voltage or higher, the control circuit 105 detects an overcharge state to output a signal of Low to the CO terminal 114. Then, the charge control N-channel FET transistor 108 is turned off to stop the charge to the secondary battery 101.

When a load is connected between the external terminals 120 and 121 and when the voltage of the secondary battery 101 decreases to be a predetermined voltage or lower, the control circuit 105 detects an overdischarge state to output a signal of Low to the DO terminal 113. Then, the discharge control N-channel FET transistor 107 is turned off to stop the discharge from the secondary battery 101.

When an abnormal discharge current flows between the external terminals 120 and 121, a voltage of the VM terminal 115 increases, and the control circuit 105 detects a discharge overcurrent state. Then, the control circuit 105 outputs a signal of Low to the DO terminal 113 to turn off the discharge control N-channel FET transistor 107, thereby stopping the flow of the abnormal discharge current from the secondary battery 101.

When an abnormal charge current flows between the external terminals 120 and 121, a voltage of the VM terminal 115 decreases, and the control circuit 105 detects a charge overcurrent state. Then, the control circuit 105 outputs a signal of Low to the CO terminal 114 to turn off the charge control N-channel FET transistor 108, thereby stopping the flow of the abnormal charge current from the secondary battery 101.

In a state in which the negative terminal of the charger is connected to the external terminal 120 and the positive terminal of the charger is connected to the external terminal 121, that is, in a charger reverse connection state in which the charger is reversely connected, the voltages of the VM terminal 115 and the external terminal 121 become closer to a power supply voltage as the voltage of the secondary battery 101. Further, when the voltage of the VM terminal 115 becomes a predetermined voltage, the charger reverse connection detection circuit 106 detects the charger reverse connection state to output a signal to the control circuit 105, and the control circuit 105 outputs a signal of High to the CO terminal 114 and a signal of Low to the DO terminal 113. In this manner, in the charger reverse connection state, the charge control N-channel FET transistor 108 is turned on to supply only a discharge current, and the discharge control N-channel FET transistor 107 is turned off to supply only a charge current due to a parasitic diode, thereby stopping the discharge current to stop the discharge of the secondary battery 101.

At the same time, the charger reverse connection detection circuit 106 detects the reverse connection of the charger, and turns on the switch circuit 131 of the consumption current increase circuit 130, thereby increasing a consumption current flowing from the VDD terminal 111 to the VSS terminal 112. A parasitic diode 110 is present from the VM terminal 115 to the VDD terminal 111, which is provided in the forward direction from the VM terminal 115 to the VDD terminal 111. When the reverse connection of the charger is detected to stop the discharge, the voltage of the VM terminal 115 becomes a value determined by adding a voltage of the charger to the voltage of the secondary battery 101, and hence the voltage of the VM terminal 115 becomes higher than the voltage of the VDD terminal 111. Thus, via the parasitic diode connected from the VM terminal 115 to the VDD terminal 111, a current flows from the VM terminal 115 toward the VDD terminal 111. When this current is represented by Ivm, Ivm flows from the VM terminal 115 toward the VDD terminal 111, the resistor 102, and the external terminal 120.

A current value flowing from the VDD terminal 111 to the VSS terminal 112 when the consumption current increase circuit 130 operates is represented by Ids. Then, when the voltage of the secondary battery 101 is represented by Vbat, a resistance value of the resistor 102 is represented by R1, and a withstand voltage between the VDD terminal 111 and the VSS terminal 112 of the charge and discharge control circuit 100 is represented by Vmax, a voltage of Vbat+(Ivm−Ids)× R1 is generated between the VDD terminal 111 and the VSS terminal 112 of the charge and discharge control circuit 100. In this case, by adjusting the current value Ids of the consumption current increase circuit 130 so as to satisfy the relationship of {Vbat+(Ivm−Ids)×R1}<Vmax, the charge and discharge control circuit 100 can be prevented from being applied with a voltage higher than the withstand voltage.

In this manner, a part of the current flowing via the parasitic diode 110 in the charger reverse connection state is caused to flow to the VSS terminal 112, thereby preventing the charge and discharge control circuit 100 from being applied with the voltage higher than the withstand voltage.

As described above, the charge and discharge control circuit and the battery device according to the first embodiment are configured to, after the reverse connection of the charger is detected, decrease the current flowing from the VDD terminal via the parasitic diode, thereby preventing the charge and discharge control circuit from being applied with the voltage higher than the withstand voltage. Consequently, the safety of the battery device can be enhanced.

Second Embodiment

Figure 2:
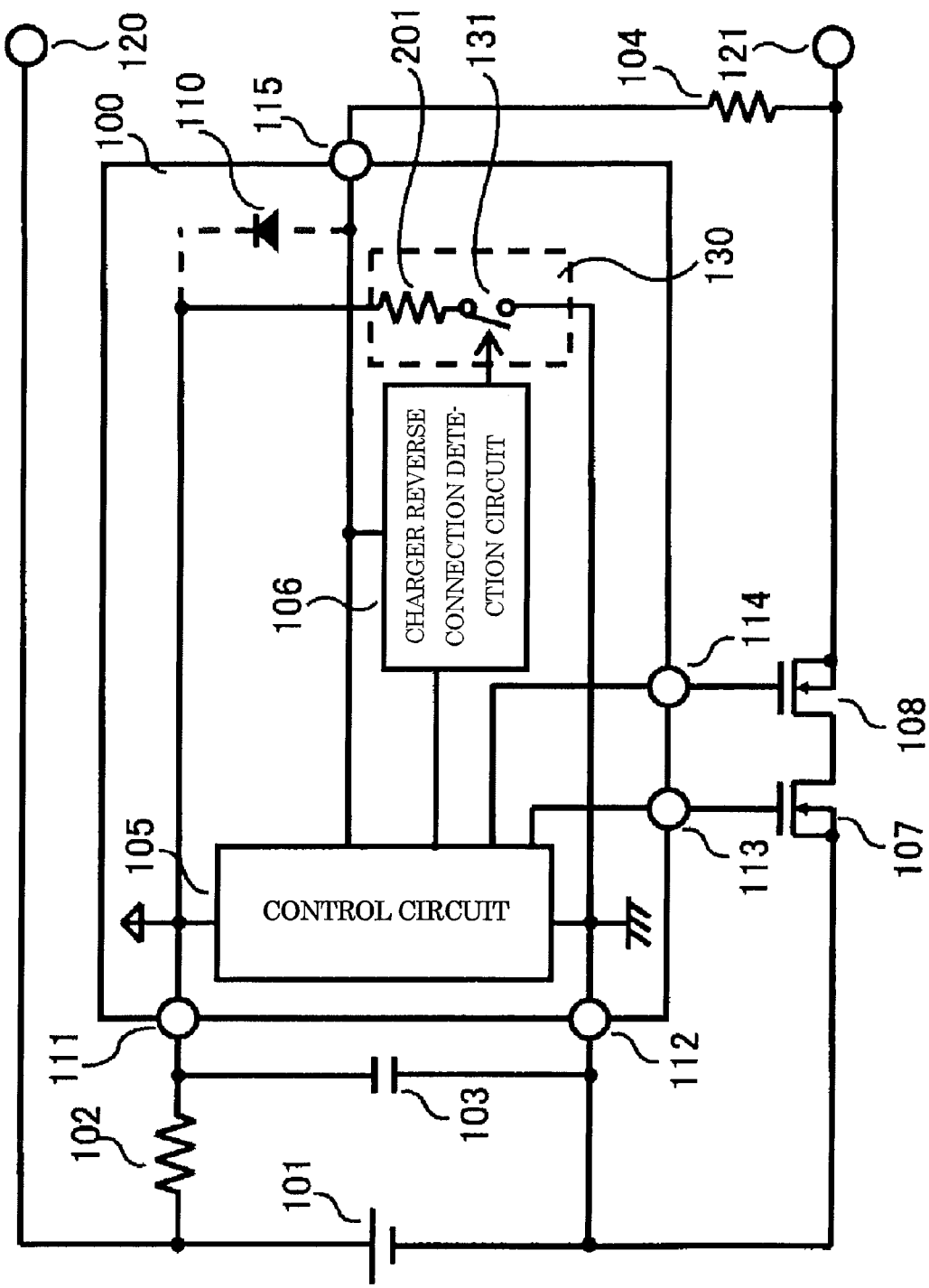
FIG. 2 is a circuit diagram of a charge and discharge control circuit and a battery device according to a second embodiment of the present invention.

FIG. 2 is a circuit diagram of a charge and discharge control circuit and a battery device according to a second embodiment of the present invention.

The second embodiment differs from the first embodiment in that a resistor 201 as an impedance element is inserted between the switch circuit 131 and the VDD terminal 111. The rest is the same as in the first embodiment.

Operations of the charge and discharge control circuit and the battery device according to the second embodiment are described below.

Operations in the overcharge state, the overdischarge state, and the overcurrent state and an operation of the charger reverse connection detection circuit 106 are the same as those in the first embodiment. When entering the charger reverse connection state, the charger reverse connection detection circuit 106 turns on the switch circuit 131 to operate the consumption current increase circuit 130. Then, a current value Ids flows from the VDD terminal 111 to the VSS terminal 112. By adjusting the current Ids by a resistance value of the resistor 201, the charge and discharge control circuit 100 can be prevented from being applied with a voltage higher than a withstand voltage.

In this manner, a part of the current flowing via the parasitic diode 110 in the charger reverse connection state is caused to flow to the VSS terminal 112, thereby preventing the charge and discharge control circuit 100 from being applied with the voltage higher than the withstand voltage.

As described above, the charge and discharge control circuit and the battery device according to the second embodiment are configured to, after the reverse connection of the charger is detected, decrease the current flowing from the VDD terminal via the parasitic diode, thereby preventing the charge and discharge control circuit from being applied with the voltage higher than the withstand voltage. Consequently, the safety of the battery device can be enhanced.

Third Embodiment

Figure 3:
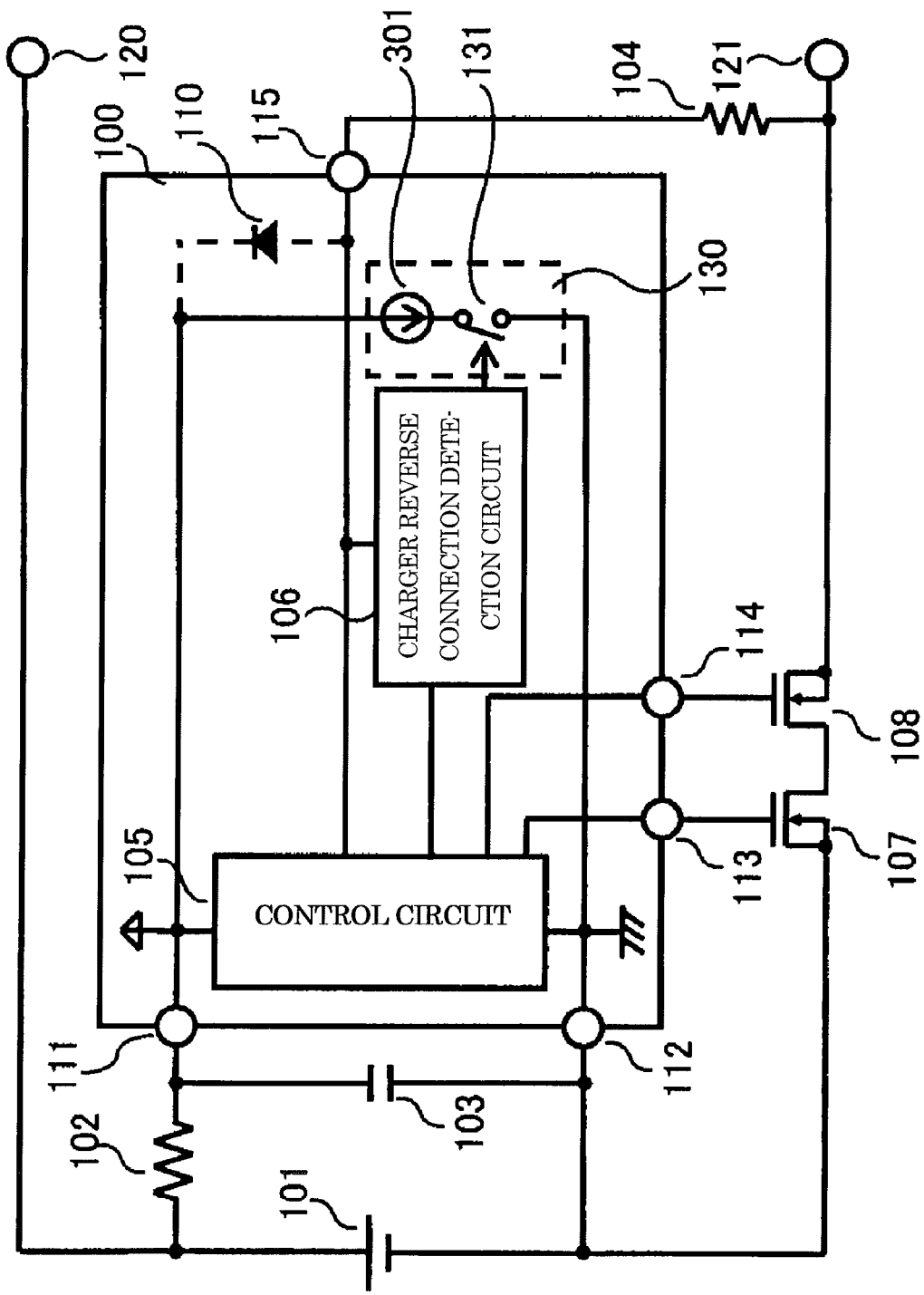
FIG. 3 is a circuit diagram of a charge and discharge control circuit and a battery device according to a third embodiment of the present invention.
Figure 4:
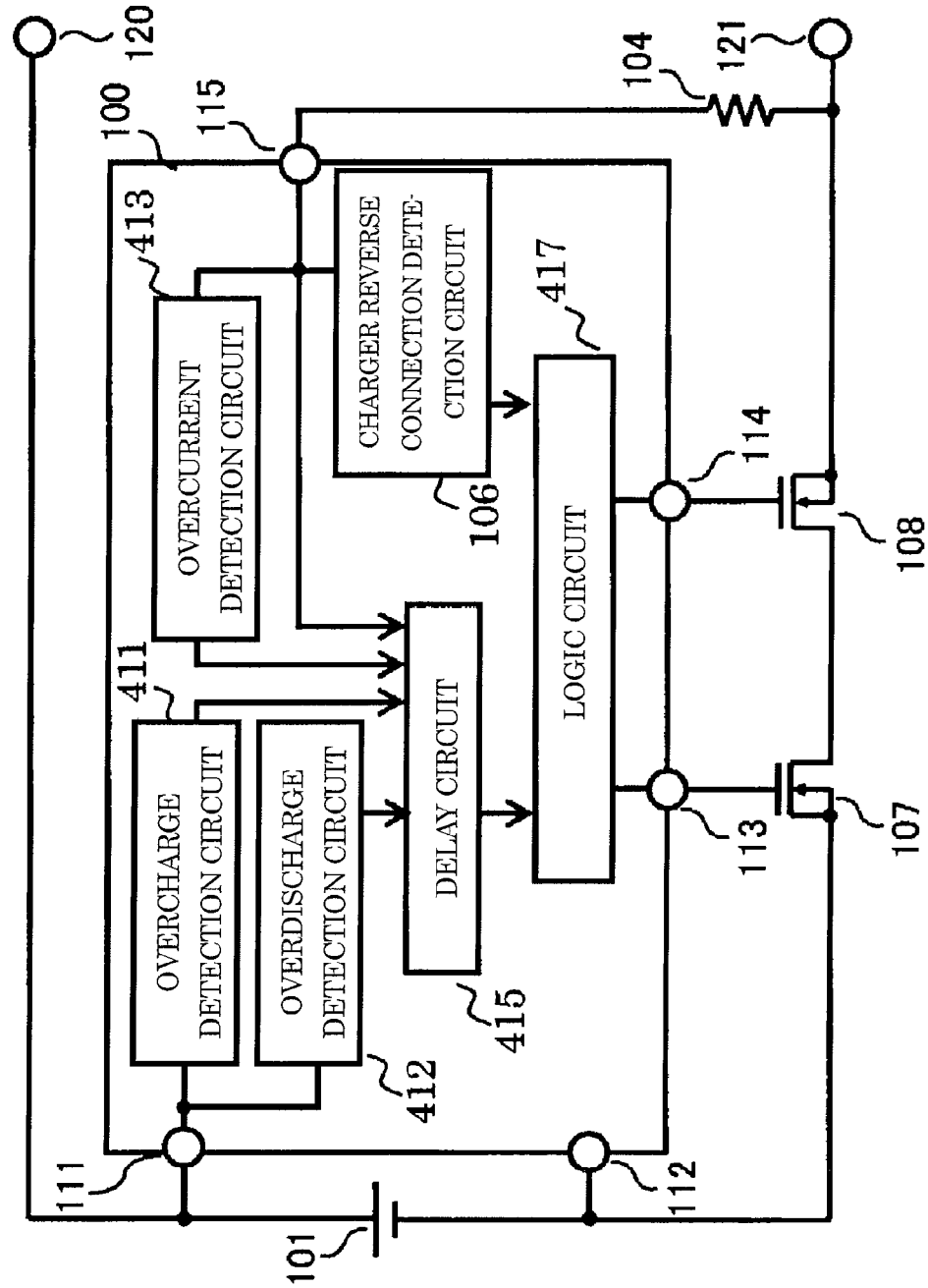
FIG. 4 is a circuit diagram of a charge and discharge control circuit and a battery device according to the related art.

FIG. 3 is a circuit diagram of a charge and discharge control circuit and a battery device according to a third embodiment of the present invention.

The third embodiment differs from the second embodiment in that the resistor 201 is replaced by a constant current circuit 301. The rest is the same as in the second embodiment.

Operations of the charge and discharge control circuit and the battery device according to the third embodiment are described below.

Operations in the overcharge state, the overdischarge state, and the overcurrent state and an operation of the charger reverse connection detection circuit 106 are the same as those in the second embodiment. When entering the charger reverse connection state, the charger reverse connection detection circuit 106 turns on the switch circuit 131 to operate the consumption current increase circuit 130. Then, a current value Ids flows from the VDD terminal 111 to the VSS terminal 112. By adjusting the current Ids by the constant current circuit 301, the charge and discharge control circuit 100 can be prevented from being applied with a voltage higher than a withstand voltage.

In this manner, a part of the current flowing via the parasitic diode 110 in the charger reverse connection state is caused to flow to the VSS terminal 112, thereby preventing the charge and discharge control circuit 100 from being applied with the voltage higher than the withstand voltage.

As described above, the charge and discharge control circuit and the battery device according to the third embodiment are configured to, after the reverse connection of the charger is detected, decrease the current flowing from the VDD terminal via the parasitic diode, thereby preventing the charge and discharge control circuit from being applied with the voltage higher than the withstand voltage. Consequently, the safety of the battery device can be enhanced.

What is claimed is:

1. A charge and discharge control circuit for controlling charge and discharge of a secondary battery connected between a first terminal and a second terminal and having a charger reverse connection detection circuit connected to a VM terminal for detecting that a charger is reversely connected, the charge and discharge control circuit comprising:
a consumption current increase circuit configured to supply a current (Ids) from the first terminal to the second terminal and comprising a switch circuit configured to turn on in response to a detection signal from the charger reverse connection detection circuit and create a current path between the first and second terminals,
wherein a value of the current (Ids) satisfies a relationship: {Vbat+(Ivm−Ids)×R1}<Vmax, where (Vbat) is a voltage of the secondary battery, (Ivm) is a current flowing from the VM terminal toward the first terminal, (R1) is a resistance between the first terminal and the secondary battery, and (Vmax) is a withstand voltage between the first and second terminals.

2. A charge and discharge control circuit according to claim 1, wherein the consumption current increase circuit further comprises an impedance element configured to adjust a current value of the current flowing from the first terminal to the second terminal.

3. A battery device, comprising:
a chargeable and dischargeable secondary battery;
a charge and discharge control switch provided in a charge and discharge path of the chargeable/dischargeable secondary battery; and
the charge and discharge control circuit according to claim 1, for monitoring a voltage of the chargeable/dischargeable secondary battery and turning on and off the charge and discharge control switch to control charge and discharge of the chargeable and dischargeable secondary battery.

* * * * *